June 3, 1930.  T. JELBART  1,761,346
REAPER THRASHER AND LIKE HARVESTING MACHINE
Filed March 3, 1927  5 Sheets-Sheet 1

June 3, 1930. T. JELBART 1,761,346
REAPER THRASHER AND LIKE HARVESTING MACHINE
Filed March 3, 1927  5 Sheets-Sheet 3

June 3, 1930.  T. JELBART  1,761,346

REAPER THRASHER AND LIKE HARVESTING MACHINE

Filed March 3, 1927   5 Sheets-Sheet 4

June 3, 1930. T. JELBART 1,761,346
REAPER THRASHER AND LIKE HARVESTING MACHINE
Filed March 3, 1927 5 Sheets-Sheet 5

Fig. 13.

Patented June 3, 1930

1,761,346

UNITED STATES PATENT OFFICE

THOMAS JELBART, OF BALLARAT, VICTORIA, AUSTRALIA

REAPER THRASHER AND LIKE HARVESTING MACHINE

Application filed March 3, 1927, Serial No. 172,462, and in Australia March 8, 1926.

This invention relates to improvements in reaper thrasher and like harvesting machines and it has for its object the provision of a simple, compact and durably constructed machine which will be economical to manufacture and maintain and will be found thoroughly efficient in use.

More particularly the object of the present invention is to provide improvements in reaper thrasher and like harvesting machines and which, inter alia, are directed to:

(1) The construction and arrangement of the parts of the crop gathering mechanism located in front of the machine.

(2) Means for adjusting the height of the crop gathering mechanism on the front of the main frame.

(3) A rotary winnower adapted to receive the thrashed material and direct the clean grain to an elevator associated with a hopper or with bagging devices and return the headings to the thrasher for retreatment.

(4) Means for maintaining the transverse alignment of the machine and for overcoming the lag of the offside wheel when the invention is applied to a "side draught" machine.

(5) The general construction and arrangement of the operative parts of the machine.

The improvements comprised in the present invention consist essentially in constructing and arranging the operative parts of a machine in such a way that the crop is gathered, thrashed and winnowed over the full or substantially the full width of the machine thereby enabling the material to be effectually gathered, thrashed and the grain and heads to be separated from the straw while passing in a direct line from the front to the back of the machine and without necessitating any lateral deviation of the material. The improvements also permit of the frame supporting the operative parts to be arranged thereon in such a way that they can be mounted on a farm tractor and driven from the engine thereof or be readily adapted to a "straight" or "side draught" type of harvesting machine.

In order that the invention may be readily understood reference will now be had to the accompanying sheets of explanatory drawings wherein.

In these drawings, like characters of reference have been employed to indicate the same or corresponding parts throughout the different views and the numeral 13 indicates the main frame which is supported on a transverse axle 14 and is provided with forward extensions on the near side which are adapted to support the forecarriage 15 and steering wheel 16.

Figure 2:
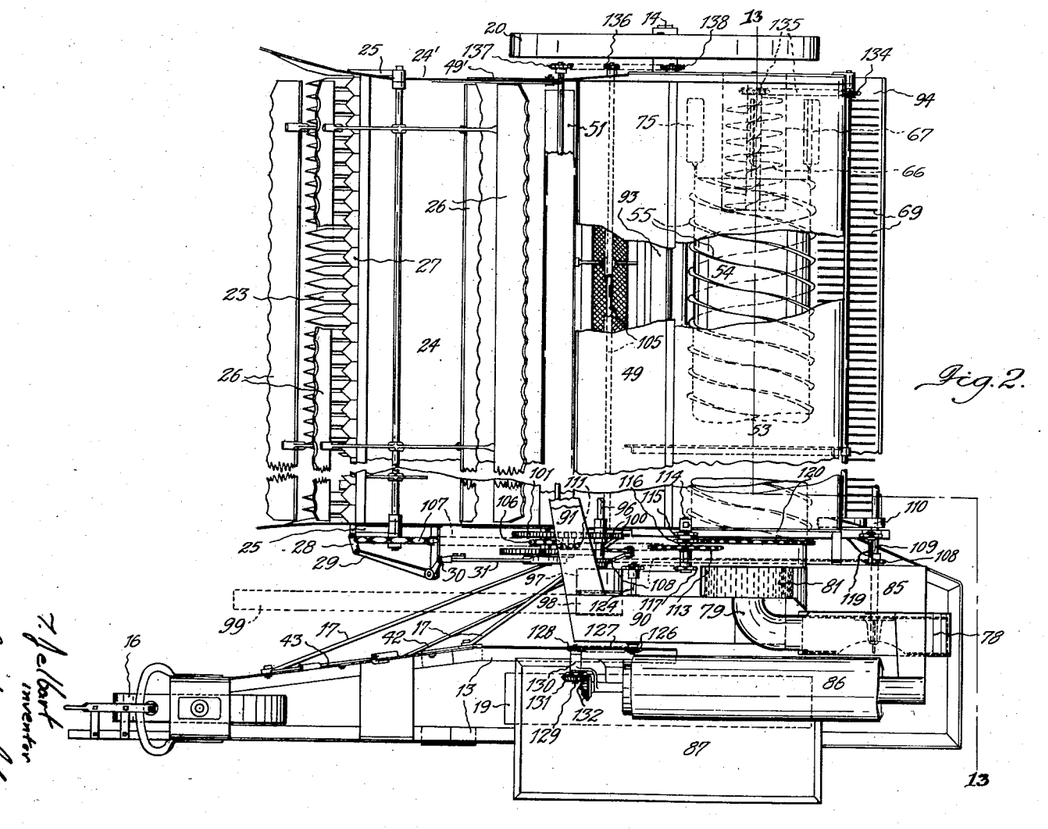
Figure 2 is a view in plan of the machine, portions of which are shown broken away for convenience of illustration.
Figures 3, 4, 5:
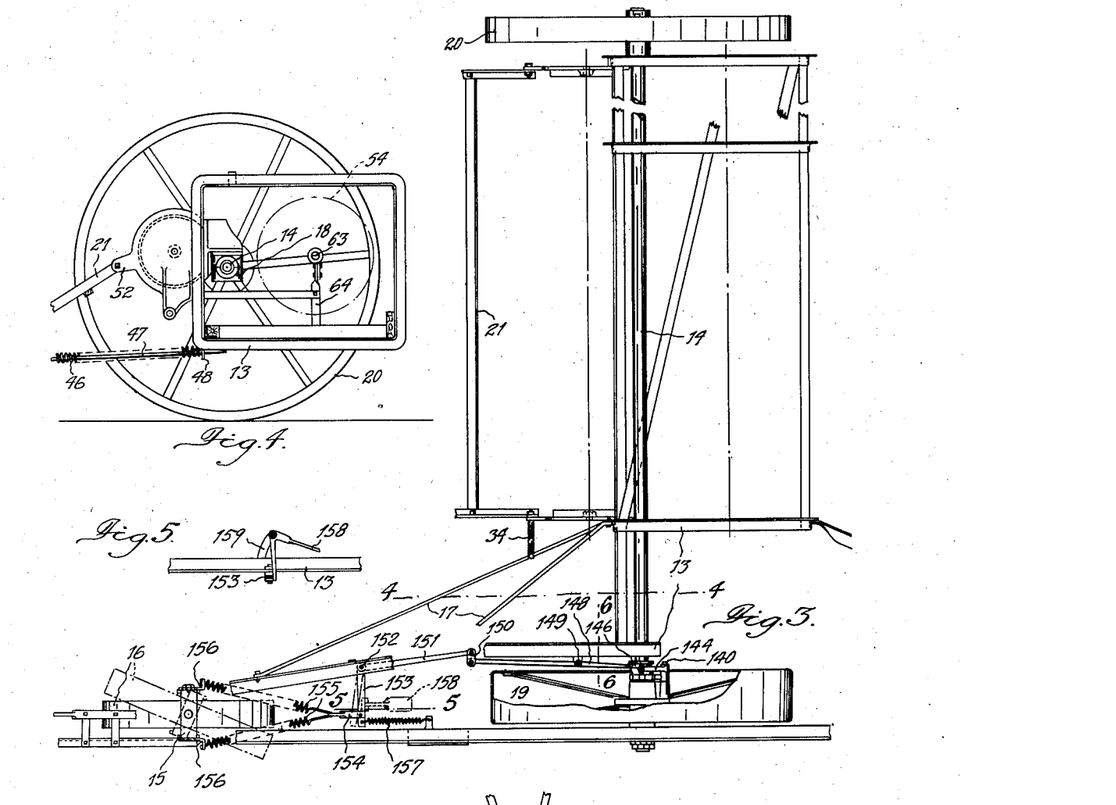
Figure 3 is a view in plan of the main frame of the machine.
Figure 4 is a view in sectional side elevation taken on the dotted line 4—4 of Figure 3.
Figure 5 is a view in side elevation of constructional details which will hereinafter be fully described.
Figure 6:
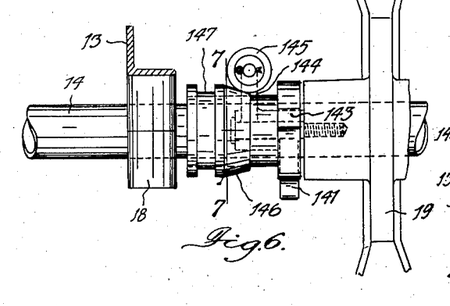
Figure 6 is a view in sectional elevation taken on the dotted line 6—6 of Figure 3 and is drawn to a larger scale.
Figure 7:
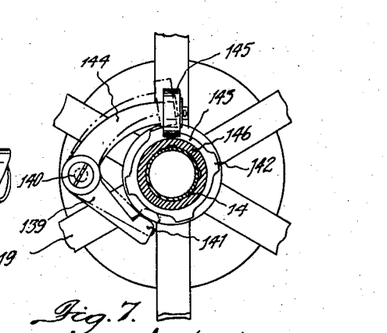
Figure 7 is a view in sectional side elevation taken on the dotted line 7—7 of Figure 6.

The forwardly extending members of the main frame are connected to the rear part thereof by diagonal stay rods or braces 17, see Figures 2 and 3 of the drawings.

The transverse axle 14 is supported in bearings 18 mounted on the main frame whereby it will normally rotate with the transport wheels 19 and 20 on the ends thereof.

A subsidiary frame 21 for supporting the crop gathering mechanism is pivotally mounted in advance of the main frame and comprises a plurality of suitably arranged longitudinal and transverse members supporting a transverse comb bar 22 fitted with short comb fingers 23. The adjustable frame supports a flexible sheet metal concave 24 of substantial dimensions which extends backward and upward from the comb bar and rear of the comb teeth. The ends of the concave are provided with vertical cheeks 24', and standards 25 fitted to the ends of the adjustable frame are adapted to support a large reel 26 which is rotated at a speed only slightly in excess of the forward movement of the machine.

The concave 24 extends the full width of the comb bar 22 and conforms to the sweep of the battens on the reel 26.

In an alternative construction the reel can be supported on forwardly extending bars 25' having their rear ends pivotally mounted on the main frame and the said bars are pivotally connected at a point between the spindle of the reel to supporting members 25² the lower ends of which are pivoted to the ends of the adjustable frame 21. The supporting members 25² are provided (near their lower ends) with rearwardly extending arms 24² which are connected to a transverse member 24³ fitted to the back and upper part of the concave 24.

When the reel is supported and connected to the concave as above described, the former will be maintained approximately in the same position relatively to the crop entering the comb during the raising and lowering movements thereof, and the concave will be automatically adjusted to accord with any alteration in the position of the reel. In order to permit of the concave flexing sufficiently to permit of its being retained close to the path of movement of the battens of the reel 26 as above indicated the front edge only is secured to the adjustable frame.

Figure 8:
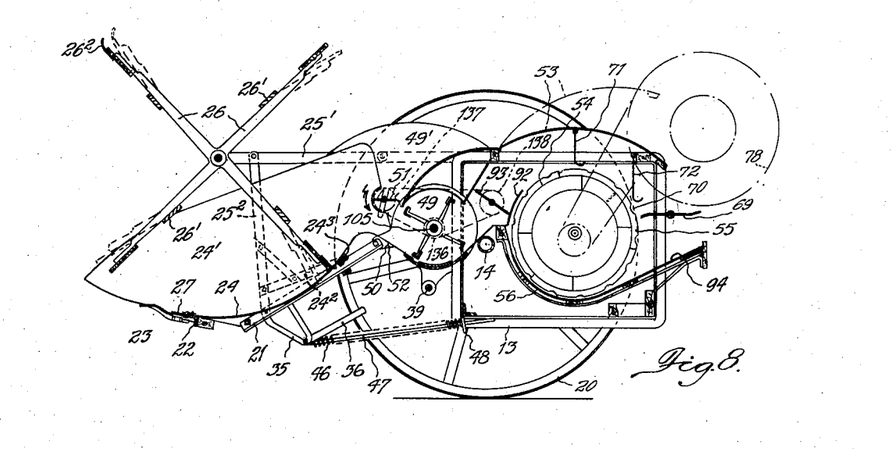
Figure 8 is a view in sectional side elevation of the machine.
Figure 9:
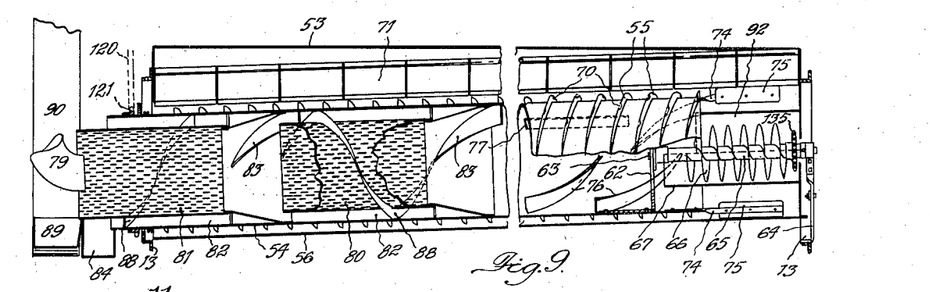
Figure 9 is a view in sectional rear elevation of the rotary winnower.
Figure 10:
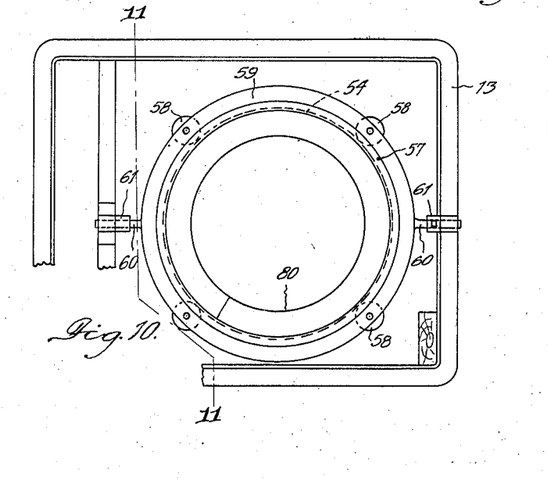
Figure 10 is a view in side elevation showing the means for rotatively supporting the near side end of the rotary winnower.
Figure 11:
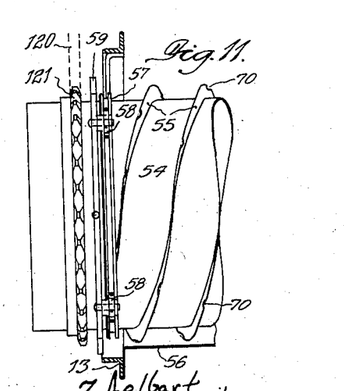
Figure 11 is a view in sectional rear elevation taken on the dotted line 11—11 of Figure 10.

The outer ends of the arms of the reel are fitted with relatively wide battens and a second series of battens as 26' can be fitted to the said arms for the purpose of facilitating the feeding in of the standing crop correctly to the comb and on to the concave (see Figure 8 of the drawings).

The object of the second series of battens 26' primarily is to prevent the heads of crop severed by the knife 27 from tilting or falling forwardly in advance of the comb and thereby resulting in loss of grain. The arms of the reel preferably are set, as indicated in dotted lines in Figure 8, so that the inner battens 26' will move slightly in advance of the outer battens.

The knife 27 is reciprocatingly mounted at the base of the comb fingers 23 and its near side end is connected by a link 28 to the long arm of a bell crank lever 29 which is pivotally mounted on a bracket projecting laterally from the adjustable frame.

The second or short arm of the bell crank lever 29 is connected by a two-way or flexible joint 30 to a pitman or connecting rod 31 adapted to be reciprocated by an eccentric 32 carried by a fixed spindle 34 arranged coaxially with the pivot points of the adjustable frame.

The bell crank 29 and the connecting rod 31 oscillate in planes disposed substantially at right angles to each other and the flexible joint 30 permits of them working freely throughout the whole range of their movement.

A bracket 35 depends from the underside of the adjustable frame at or near each end thereof and pivotally connected to the lower end of each bracket is the forward end of a bar 36 having a rack 37 fitted to its rear end which is adapted to engage the teeth of a pinion 38 fitted to a spindle 39 supported on the main frame.

The rack 37 is maintained in engagement with the pinion 38 by means of a saddle 40 freely mounted on the spindle 39.

The spindle 39 is fitted with an arm 41 the free end of which is connected by a rod 42 to a raising and lowering lever 43 mounted on the main frame.

The raising and lowering lever 43 is pivotally mounted on the forward extension of the main frame and is disposed conveniently to the seat 45 for the operator and the parts are so arranged that when the raising and lowering lever is pulled rearwardly the adjustable frame will be raised and when thrust forwardly the said adjustable frame will be lowered.

In order to facilitate the raising of the adjustable frame compensating springs 46 are fitted to rods 47 pivoted to the lower ends of the bracket 35 and having their rear ends slidably engaged by lugs 48 on the main frame (see Figure 8 of the drawings.) The compression springs 46 are adapted to exert an upward thrust on the adjustable frame and facilitate the raising thereof.

The heads of crop and straw severed by the knife 27 are brushed rearwardly and upwardly over the surface of the concave 24 by the battens on the reel 26 and towards the mouth of a thrasher 49 disposed at the rear and extending the full width thereof. The surface of the flexible concave is quite smooth and the rear edge thereof is located slightly in advance of the thrasher.

The side cheeks 24' of the concave 24 project rearwardly and overlap side cheeks 49' projecting upwardly from the ends of the thrasher and these side cheeks serve to prevent cut crop passing over the ends of the concave and to guide it correctly to the mouth of the thrasher. A forwardly inclined plate is disposed above the thrasher between the side cheeks 49′ and this plate is so arranged that any of the cut crop carried above the thrasher by the reel will gravitate toward the mouth thereof.

The outer edges of the battens of the reel 26 may be provided with strips of leather 26² or other flexible material to assist in sweeping the material over the surface of the concave 24 toward the mouth of the thrasher.

The upper edge of the concave is formed with a rearwardly inclined lip 50 adapted to overlap the bottom of the mouth of the thrasher and the said lip 50 is constructed and arranged so as to flex freely when the adjustable frame is raised and lowered.

The pivot point of the adjustable frame is arranged as near as possible to the mouth of the thrasher to avoid any undue flexing of the lip 50.

In order to facilitate the feeding in of the heads and straw to the thrasher, an adjustably mounted rotary baffle 51 is disposed above the mouth of the thrasher and just clear of the path of movement of the battens on the reel. The thrasher which preferably extends the full width of the machine can be made in one or more sections as desired.

In lieu of providing a reel and concave as hereinbefore described for directing the severed crop rearwardly to the thrasher an endless conveyor member or members fitted with transverse battens and operating over an apron may be employed for conveying all of the severed crop rearwardly in a direct path to the mouth of the thrasher.

The end cheeks of the thrasher are secured in an approved manner to the main frame and are provided with forwardly projecting lugs 52 to which are bolted the rear ends of the longitudinal members of the adjustable frame and with downwardly projecting lugs carrying the spindle 39 of the raising and lowering gear.

The throat of the thrasher 49 opens into the upper part of a hood 53 arranged to cover a transversely disposed open ended cylindrical drum 54 of imperforated material which is revolvably mounted therein.

The imperforated cylindrical drum 54 is provided with peripherally disposed helical vanes 55 which extend nearly the full length thereof and is accommodated in a trough 56 which with the said cylindrical drum preferably inclines slightly towards the near side of the machine.

Two, three or more helical vanes 55 can be arranged on the periphery of the drum 54 and they can be of uniform pitch throughout or the pitch may increase progressively towards the offside end thereof to facilitate the conveyance of the material along the trough 56.

The near side end of the cylindrical drum is provided with a circumferentially disposed channel shaped track 57 adapted to take rollers 58 carried in a ring 59 having trunnions 60 pivotally supported in bearings 61 on the main frame.

The channel shaped track engages with the rollers 58 and prevents end movement of the cylindrical drum and the pivotal supports for the ring 59 permit of a vertical adjustment of the offside end of the same when it is desired to alter the inclination thereof.

When it is not desired to adjust the inclination of the cylindrical drum the ring 59 is fixedly mounted on the main frame.

The offside end of the cylindrical drum terminates at a little distance from the offside of the machine and is fitted with an interiorly disposed bracket 62 supporting an axially disposed spindle 63, the outer end of which is rotatively supported in a bearing carried by a bracket 64 fitted to the main frame.

Alternatively the spindle can be fitted to the bracket 64 and its inner end can be rotatively supported in the bracket 62.

Upon the spindle 63 between the brackets 62 and 64 is a revolvable sleeve 65 carrying a helical conveyor worm 66 which is adapted to rotate in a trough 67 supported concentrically within the offside end of the cylindrical drum.

The cylindrical drum is rotated in a clockwise direction (when viewed from the near side of the machine) by chain and sprocket gearing.

The thrashed straw and grain passing from the throat of the thrasher falls upon the top of the cylindrical drum and is carried by the helical vanes 55 towards a rotating straw walker 69 disposed at the rear of the said drum.

The edges of the vanes on the cylindrical drum preferably are provided with notches 70 to enable the straw to be engaged and carried rearwardly thereby and the hood 53 is provided with series of depending pivoted baffles 71 and 72 which ensure the straw being retained close to the periphery of the drum. The sections of the baffles 71 are arranged to alternate with the sections of the baffles 72, that is to say, the division between the sections of the baffles 71 are disposed in longitudinal alignment with the centres of the sections of the baffles 72.

The rotary straw walker 69 comprises a spindle having a plurality of prongs projecting therefrom and is rotated in the same direction as the drum by chain and sprocket gearing.

The thrashed and partially thrashed grain and small particles of straw gravitate to the bottom of the trough 56 surrounding the lower part of the drum and the helical vanes 55 are disposed in such a way as to cause the material passing to the bottom of the trough to be carried to the offside thereof.

The offside end of the cylindrical drum 54 is formed with a series of arms or projections 74 having scoops 75 fitted thereto which are adapted to pick up the material from the bottom of the trough and deliver the same to the trough 67.

The helical conveyor operating in the trough 67 is arranged to direct the material delivered thereto into the offside or upper end of the cylindrical drum.

The slight inclination of the cylindrical drum will enable material delivered to the upper end thereof from the trough 67 to gravitate gradually towards the near side of the machine and in its passage along the said drum it is raised by helical baffles 76 and longitudinally disposed baffles 77 and allowed to fall whereby the cavings, straw and other light material will be carried away from the upper end of the drum by a blast of air introduced at the near side and lower end thereof.

The blast of air is produced by a fan 78 mounted on the main frame and is directed into the centre of the lower end of the cylindrical drum through a chute 79. The baffles 76 and 77 are arranged within the upper portion or offside end of the cylindrical drum and they are designed to periodically raise and drop the material through the path of the air blast.

It will be understood that the initial cleaning of the grain and separation of particles of straw therefrom will be effected near the upper end of the cylindrical drum and that the air blast will direct the lighter material separated from the grain out of the same end thereof.

The helical baffles 76, besides raising the material from the bottom to the top of the cylindrical drum, also serve to convey the material towards the lower end of the said drum, thereby ensuring satisfactory winnowing operations to be performed even when the drum inclines towards the offside of the machine as in traversing the side of a hill.

The interior of the drum towards the lower end or near side thereof is provided with one or more cylindrical perforated screens (two being shown in the drawings 80 and 81).

The perforated screens are of smaller diameter than the drums and are concentrically arranged therein, thus leaving annular spaces 82 between the screens and the cylindrical drum.

The upper ends of the screens are tapered or formed as frustums of cones whereby they are secured to and their diameters fit closely against the interior of the cylindrical drum.

The tapered upper portions of the screens can be formed of plain or foraminous material and they can be provided with interiorly disposed baffles 83 to assist in directing the grain and headings into the screens from the adjacent parts of the cylindrical drum.

The grain delivered to the screens 80 passes through the meshes therein and into the annular spaces 82 therearound and this separation of the grain from the partially thrashed heads and lighter material enables a better separation of the said lighter material and conveyance of the same through the cylindrical drum by the air blast.

The unthrashed heads are delivered from the lower end of the first screen 80 on to the tapered upper end of the second screen 81 and the grain from the annular space 82 is directed by the baffle 83 into the second screen.

The clean grain passes through the meshes of the screen 81 into the second annular chamber 82 and gravitates therefrom to the boot 84 of a clean grain elevator 85 which delivers it to a rotary screen 86 located above a grain box 87.

In order to facilitate the passage of the clean grain along the annular spaces 82 the screens 80 and 81 are provided with peripherally disposed helical vanes 88 but in some cases these vanes may not be required as when sufficient inclination is given to the cylindrical drum to ensure the grain gravitating more or less freely therealong.

The headings or partially thrashed grain passing through the screen 81 is discharged into the boot 89 of a headings elevator 90, the upper end of which is provided with a chute 91 for directing the said headings into the mouth of the thrasher for retreatment.

If preferred the headings can be directed from the elevator 90 to an auxiliary thrasher (not shown) operated from any convenient part of the machine and delivering into the winnower.

The offside of the throat of the thrasher is provided with an upwardly projecting baffle 92 which is disposed in advance of the space between the offside end of the cylindrical drum and the adjacent side of the machine and the object of this baffle is to cause the straw and thrashed material to be directed upwardly and obviate it falling upon the scoops as the latter are moving upwardly to deliver grain to the trough 67.

A rotary baffle 93 can be disposed in the throat of the thrasher to facilitate the passage of the straw and thrashed material to the top of the cylindrical drum.

The helical vanes 55 act as straw walkers and carry the thrashed straw rearwardly over the drum when it will fall upon the rotary straw walker 69. In the passage of the straw over the cylindrical drum and rotary straw walker 69, the grain and partially thrashed heads will gravitate through the straw and either pass downwardly to the trough 56 between the vanes 55 or on to the rearwardly inclined extension 94 of the said trough which is situated below the rotary straw walker 69.

Figures 1, 12:
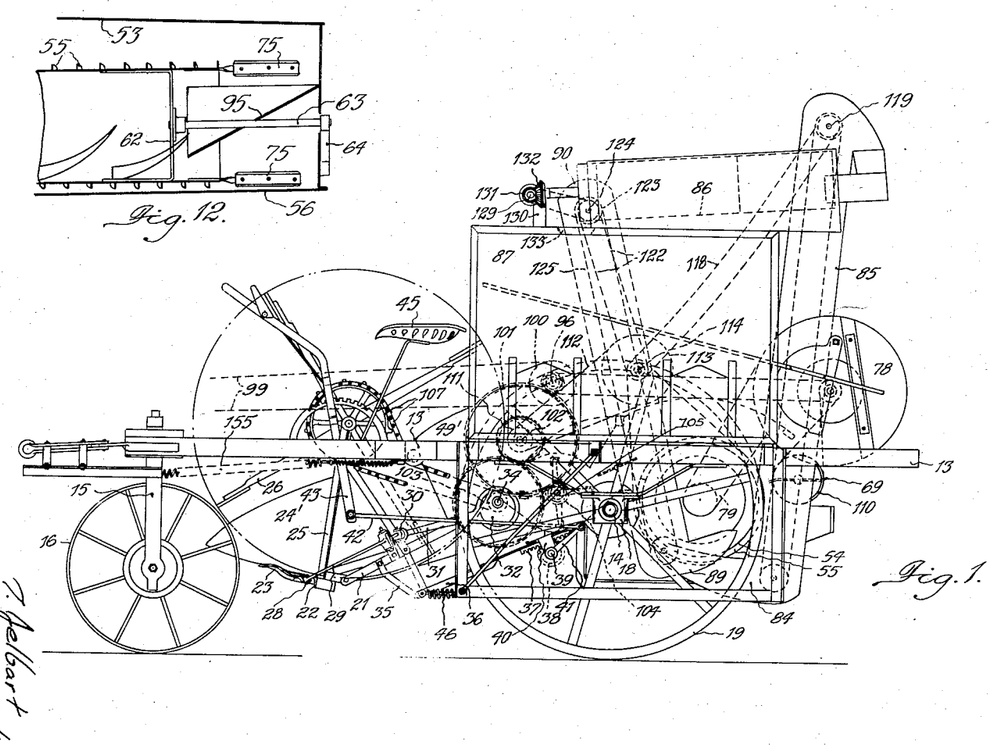
Figure 1 is a view in side elevation of a reaper thrasher machine embodying improvements constructed and arranged in accordance with the present invention.
Figure 12 is a view in sectional rear elevation of the offside end of a modified form of rotary winnower.

In a modification of the rotary winnowing mechanism the scoops can be arranged to deposit the material directed to the offside end of the trough 56 on to a fixed inclined plate 95 having its lower end extending slightly into the upper end of the cylindrical drum.

In this instance the rotary conveyor 66 and trough 67 are dispensed with and the material delivered on to the said inclined plate 95 will gravitate freely into the upper end of the cylindrical drum.

Figure 13:
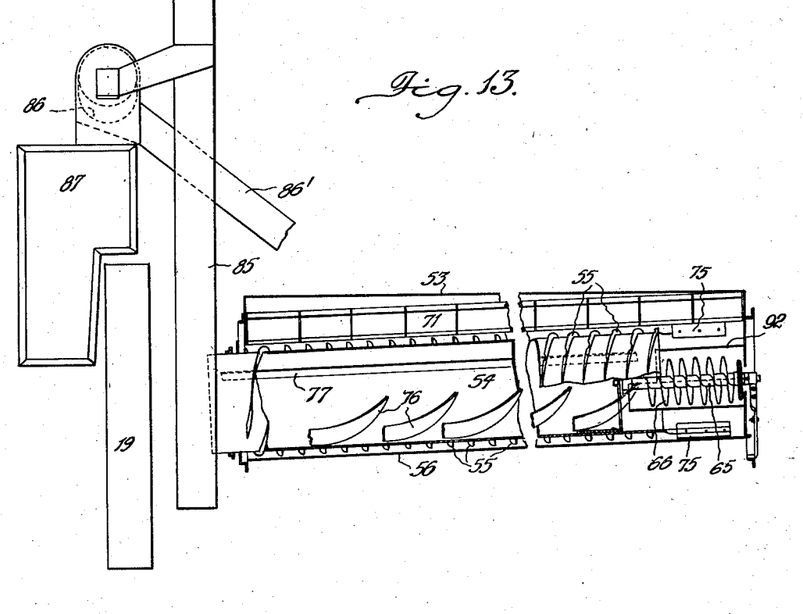
Figure 13 is a view in sectional rear elevation taken on the dotted line 13—13 of Figure 2.

In a modification of the invention illustrated in Figure 13, the heading elevator 90 is dispensed with and the clean grain and headings are taken by the elevator 85 to the rotary screen and the material rejected by the screen through a chute 86' to the thrasher 41. In this modified construction the screens 80 and 81 in the lower end of the cylindrical drum 54 are dispensed with.

In the arrangement illustrated in the drawings the power transmission mechanism is designed to be operated by belt and pulley gearing from an engine (not shown) mounted upon the fore part of the main frame.

A drive shaft 96 mounted on the main frame is provided with fast and loose belt pulleys 97 and 98 and motion is imparted thereto from the power unit by a belt 99.

The drive shaft is fitted with a pinion 100 which is adapted to mesh with a spur wheel 101 rotatively mounted on a spindle 102 and the spur wheel meshes with a pinion 103 carried by the spindle 34 and with a pinion 104 fitted to the spindle 105 of the thrasher drum.

The train of gears above described enables motion to be transmitted to the thrasher drum and to the eccentric 32 for operating the knife 27.

The spindle 34 is fitted with a sprocket 106 from which motion is transmitted by chain and sprocket gearing 107 to the reel 26 whereby the said reel will be rotated at a speed slightly in excess of the forward movement of the machine and will not thrash the heads of grain while the same are being carried over the flexible concave. Motion is transmitted from the drive spindle 96 through chain and sprocket gearing 108 to the fan spindle 109 and motion is transmitted from the said fan spindle by belt and pulley gearing 110 to the spindle of the rotary straw walker 69.

A sprocket 111 is mounted on the spindle 102 and is connected by a chain 112 to a sprocket 113 mounted on the spindle 114 supported on the main frame.

The sprocket 113 is rigidly connected to sprockets 115, 116 and 117 all of which are rotatively supported on the spindle 114.

The sprocket 115 is connected by a chain 118 to a sprocket mounted on a spindle 119 passing through the upper end of the clean grain elevator 85 and motion is imparted to the cylindrical drum by a chain 120 and sprocket 121 from the sprocket 116 on the spindle 114.

The sprocket 117 is connected by a chain 122 to a sprocket 123 fitted to a spindle 124 passing through the upper end of the headings elevator 90 whereby motion can be imparted to the endless chain 125 operating within the said elevator. The spindle 124 is fitted with a sprocket 126 which is connected by a chain 127 to a sprocket 128 fitted to a spindle 129 carried by a bracket 130 fitted to the top of the grain box 87.

A bevel pinion 131 on the shaft 129 meshes with a bevel pinion 132 on the spindle of the rotary screen whereby motion is imparted to the said screen.

The clean grain from the rotary screen 86 is passed through an opening 133 in the top of the grain box in the usual way.

The offside end of the spindle of the straw walker 69 is fitted with a sprocket 134 from which motion is transmitted by chain and sprocket gearing 135 to the helical conveyor 66 operating in the trough 67 in the offside end of the rotary drum 54.

The offside end of the spindle of the thrasher drum is fitted with a sprocket 136 from which motion is imparted by chain and sprocket gearing 137 and 138 to the rotary baffles 51 and 93.

It will be obvious that the mechanism for transmitting motion to the operating parts of the machine can be arranged in various ways other than those hereinbefore described.

In side draught harvesters of the type illustrated in the drawings there is always a tendency for the offside wheel to lag somewhat and the machine to consequently get out of transverse alignment thereby occasioning the machine to gradually cut deeper into the crop and to offer greater resistance to the traction employed to haul the same.

In order to eliminate the abovementioned disadvantage certain constructional features have been introduced into the machine and these form salient features of the present invention.

With this object in view, the main axle 14 is rotatively supported in bearings 18 fitted to the main frame and the offside main wheel is secured rigidly to the axle and automatically or manually controlled clutch mechanism is employed to place the near side transport wheel in fixed or revolvable relationship with the main axle as desired.

The clutch mechanism comprises a pawl 139 pivotally mounted on a pin 140 projecting inwardly from the boss of the near side main wheel 19 and having a hook shaped end 141 adapted to normally engage with teeth 142 on the circular dog 143 keyed to the axle 14.

The pawl 139 is provided with a tail piece 144 having a roller 145 rotatively mounted thereon and normally bearing against the upper face of the tapered ring 146 slidably mounted on the axle. The ring is provided with a circumferential groove 147 adapted to engage the forked end of a lever 148 pivotally mounted at 149 to the main frame.

The front end of the lever 148 is connected by a link 150 to the rearwardly projecting arm of a bell crank lever 151 pivotally mounted on the main frame at 152.

The laterally projecting arm 153 of the bell crank is provided with a forwardly projecting shackle 154 which is connected by tension springs or resilient connecting members 155 to lugs 156 fitted to the opposite sides of the forecarriage 15 for the steering wheel 16.

A constant rearward pressure is maintained on the arm 153 of the bell crank by means of a spring 157 whereby when the steering wheel is in line with the draft the arm 153 will be in its rearmost position and the lever 148 so disposed that the tapered ring will be pressed towards, and the hooked end of the pawl 141 maintained in engagement with the teeth on the said dog ring.

When the pawl 139 is in engagement with the teeth of the dog ring 143 the transport wheel 19 will be locked to the axle and will rotate with the offside wheel 20 thereby obviating or overcoming any tendency of the offside wheel 20 to lag therebehind when the machine is in motion.

The offside main transport wheel 20 preferably is slightly larger in circumference than the near side transport wheel to compensate for any slight slip or skid which might occur when the machine is in motion.

When the forecarriage and steering wheel is turned out of alignment, as for instance into the position shown in dotted lines in Figure 3, the initial tension applied to one of the springs or resilient connecting members 155 will cause the arm 153 of the bell crank lever to be moved forwardly and the lever 148 to be oscillated to move the tapered ring inwardly on the axle. When the tapered ring is withdrawn from engagement with the roller to release the clutch mechanism any further angular movement of the forecarriage will cause the connecting member 155 to extend without imparting any undue strain to the associated parts.

When the tapered ring is moved inwardly as above described the pawl will be allowed to disengage from the teeth of the dog ring thereby allowing the transport wheel 19 to rotate freely on the axle and independently of the offside transport wheel 20.

The releasing of the transport wheel 19 permits of the machine to readily negotiate corners and immediately the steering wheel is moved back into alignment with the transport wheel 19 the tapered ring will be returned to its normal position thereby bringing the pawl into engagement with the dog ring 143 and locking the transport wheel 19 to the axle.

If preferred the clutch mechanism may be manually operated as by a hand lever or foot pedal and independent of any movement of the forecarriage and steering wheel.

In Figure 5, I have shown a foot operated lever 158 pivoted on a bracket 159 and having an arm depending at the rear of the arm 153 of the bell crank. By depressing the foot lever 158 the bell crank can be operated to oscillate the lever 148 to move the tapered ring to release the pawl from the dog ring. When the operator's foot is removed from the said lever 148 the said spring 147 will cause the parts to be returned to their normal positions.

In practice it may be found advisable to rigidly mount the near side main wheel 19 on the axle 114 and to mount the offside main wheel 20 freely thereon and to arrange the clutch mechanism so as to place the said offside wheel into or out of fixed relationship with the axle. In this arrangement of the clutch mechanism, suitable means associated with the lever 148 may be employed for shifting the tapered ring as desired.

It will be obvious that clutch mechanism widely different in construction can be substituted for that hereinbefore described for normally locking one of the transport wheels to the axle and that the automatically or manually controlled devices for actuating the same can be modified in various ways without departing from the spirit and scope of the invention.

Whilst I have described in the foregoing specification one embodiment of the invention as adapted particularly to a side draught machine, I wish it to be clearly understood that the invention may be applied equally as well to a push or central draught machine wherein the steering wheel and a power unit or traction animals are disposed at the rear or other part of the machine.

When the machine is mounted upon or in front of a tractor or a power unit is mounted upon the frame at the rear of the machine, power can be transmitted from a power take-off shaft to the spindle 109 of the fan and motion can be transmitted from the said spindle by suitable gearing to the operative parts of the machine.

I claim:

1. In a harvesting machine, a rotary drum disposed at the rear of the machine, peripherally disposed combined straw walking and conveying elements on the drum, means for delivering the grain and partially thrashed heads conveyed to the end of the drum into the interior thereof, means for conveying the grain and partially thrashed heads through the drum, means for passing a blast of air through the drum for separating the lighter material from the grain and partially thrashed heads, means for raising and dropping the grain and partially thrashed material through the blast of air passing through the drum, and means within the rotary drum for separating the clean grain from the partially thrashed heads.

2. In a harvesting machine, a trough, a drum rotatively mounted in the trough, helical vanes on the periphery of the drum adapted to direct thrashed straw over the rear of, and convey grain and unthrashed heads longitudinally of, the trough, means for delivering the grain and unthrashed heads from one end of the trough to the interior of the drum, blades on the interior of the drum for raising and dropping the grain and partially thrashed heads passing therethrough, means for directing a blast of air through the drum in opposition to the grain and partially thrashed heads, and means at or near the discharge end of the drum for separating the grain from the unthrashed heads.

3. In a harvesting machine, a trough adjacent to the discharge of the thrasher element on the machine, a drum rotatively mounted in the trough, helical vanes on the periphery of the drum adapted to direct the thrashed straw over the rear of, and convey the grain and unthrashed heads longitudinally of, the trough, means for delivering the grain and unthrashed heads from the trough to the interior of the drum means for feeding the grain and unthrashed heads through the drum, and means for separating the grain and unthrashed heads from the lighter material within the drum.

4. In a harvesting machine, a winnower, comprising a trough, a drum rotatively mounted in the trough, helical vanes on the periphery of the drum adapted to convey the thrashed straw rearwardly over the trough and the grain and partially thrashed heads, adjacent to the feed point of the drum, means for directing the grain and partially thrashed heads from the trough into the interior of the drum, and means for separating the straw and other light material from the grain and unthrashed heads within the drum.

5. In harvesting machines, a winnower comprising a trough, a drum rotatively mounted in the trough, means associated with the drum for conveying thrashed straw over one side of the trough, means for conveying grain and partially thrashed heads longitudinally of the trough, means for passing the grain and partially thrashed heads to the interior of the drum, means for separating straw and any light material from the grain and partially thrashed heads within the drum, and means for separating the grain from the unthrashed heads.

6. In a harvesting machine, a winnower having a rotatively mounted imperforated cylindrical drum, means at one end of the drum for passing grain and unthrashed heads thereto, curved baffles located within the feed end of the drum, a grading screen disposed concentrically within the discharge end of the drum, a fan for passing a blast of air axially through the drum from the discharge end thereof and in opposition to the passage of the material passing therethrough.

7. In a harvesting machine, a winnower comprising a shallow trough, an imperforated cylindrical drum rotatively mounted within the trough, elevating members associated with the feed end of the drum, a delivery device adapted to receive the grain and unthrashed heads from the elevating members and to pass the same into the feed end of the drum, means for passing a blast of air through the drum from the discharge to the feed end thereof, and baffles within the feed end of the drum for feeding material therethrough and for raising and dropping the material through the path of the air blast.

8. In a harvesting machine, a winnower comprising a shallow trough, an imperforated cylindrical drum arranged at an inclination and rotatively mounted within the trough, elevating members associated with the upper end of the drum, a delivery device adapted to receive grain and unthrashed heads from the elevating members and to pass the same into the upper end of the drum, a fan arranged to pass a blast of air into the lower end of and through the drum, baffles within the feed end of the drum for raising and dropping the material through the path of the air blast, and a separating screen disposed concentrically within the lower end of the drum.

9. In a harvesting machine, a winnower having a rotatively mounted drum, means for delivering grain and unthrashed heads to one end of the drum, means for passing a blast of air through the drum in an opposite direction to the material passing therethrough, means within the drum for subjecting the material to the influence of the blast of air, one or more screens arranged concentrically within or adjacent to the delivery end of the drum, and flared ends on the screens remote from the delivery end of the drum adapted to assist in directing the material thereinto.

10. In a harvesting machine, the combination with the subject matter of claim 9, of a fan, a chute passing from the fan and arranged to direct a blast of air into the discharge end of the lowermost screen and longitudinally of the drum.

11. In a harvesting machine, a winnower having a rotatively mounted drum, means for delivering grain and unthrashed heads to the drum, means for passing a blast of air to and through the drum, means adjacent to the feed end of the drum for subjecting the material to the influence of the blast of air, one or more screens arranged concentrically within the delivery end of the drum, flared ends on the screens remote from the delivery end of the drum for facilitating the passage of the material thereinto, blades or vanes for feeding the material along the drum and into the screens, and helical blades in the annular chambers between the screens and the drum.

12. In a harvesting machine, a trough located at the rear of the thrasher, a rotatively mounted imperforated drum disposed within the trough, straw walking devices associated with the drum for directing the thrashed straw out of the machine, means for directing the grain and unthrashed heads into the feed end of the drum, means within the drum for directing the material therethrough, means for passing a blast of air through the drum from the discharge end thereof for removing the light material, and means disposed interiorly of the drum for separating the grain from the unthrashed heads.

13. In a harvesting machine, a winnower comprising a trough, a drum rotatively mounted in the trough, one or more helical vanes on the periphery of the drum adapted to convey thrashed straw delivered thereon over the side of the trough and for conveying the grain and unthrashed heads to one end of the trough, a space between the delivery end of the trough and the adjacent end of the drum, scoops projecting from the end of the drum and adapted to rotate in the said space, a fixed trough projecting into the end of the drum and adapted to receive the material raised by the said scoops, a helical conveyor operatively mounted in the second mentioned trough for delivering the material into the drum, means for operating the conveyor means for passing a blast of air through the drum, and means disposed interiorly of the said drum for separating the lighter material from the grain and unthrashed heads.

14. In a harvesting machine, the combination with the subject matter of claim 13, of means for rotatively supporting the ends of the drum, helical and longitudinal vanes on the inside and adjacent to the feed end of the drum for periodically raising and dropping the material through the blast of air passing therethrough, one or more screens disposed concentrically within the discharge end of the drum, flared ends on the screens remote from the delivery end of the drum adapted to assist in the passsage of the material thereto, helical vanes within the flared portions of the screens and helical blades surrounding the screens and adapted to direct the grain passing therethrough towards the discharge end of the drum.

15. A harvesting machine according to claim 11 wherein clean grain and headings elevators are disposed at the delivery end of the drum, and one of the screens projects beyond the delivery end of the drum whereby the unthrashed heads passing therethrough will be directed into the headings elevator and the clean grain passing from the discharge end of the drum will be directed into the clean grain elevator.

16. In a harvesting machine, a winnower comprising a trough, a drum rotatively mounted in the trough, one or more helical vanes on the periphery of the drum adapted to convey thrashed straw delivered thereon over the side of the trough and for conveying the grain and unthrashed heads to one end thereof, a space between the delivery end of the trough and the adjacent end of the drum, scoops fitted to tne end of the drum and adapted to rotate within the said space, an inclined plate fixedly supported within the said space and having one end projecting into the drum, means for passing a blast of air through the drum to remove the light material, and means disposed interiorly of the said drum for separating the grain and unthrashed heads.

17. In a harvesting machine the combination with the subject matter of claim 6, of a trough surrounding the lower part of the rotatively mounted drum, scoops projecting longitudinally from the feed end of the said drum, and a trough and helical conveyor adapted to receive and direct the material raised and delivered thereto by the scoops into the feed end of the drum.

18. In a harvesting machine, the combination with the subject matter of claim 6, of a trough surrounding the lower part of the rotatively mounted drum, scoops projecting longitudinally from the feed end of the said drum and an inclined plate adapted to receive and direct the material raised and delivered thereto by the scoops into the feed end of the drum.

19. In a harvesting machine the combination with the subject matter of claim 5, of a space between the delivery end of the trough and the adjacent end of the drum, and a baffle disposed in advance of the space between the drum and the adjacent end of the trough for deflecting the straw projected from a thrasher above the said space.

20. In a harvesting machine, the combination with the subject matter of claim 5, of a hood or cover supported above the rotatively mounted drum, series of pivotally supported baffles depending from the hood, and a rotary straw walker located at the rear of the drum and above the adjacent side of the trough.

21. In a harvesting machine, the combination with the subject matter of claim 5, of baffles supported above the rotatively mounted drum and adapted to deflect the thrashed material thereon, a straw walker at the rear of the drum, and an inclined extension on the rear side of the trough projecting beneath the straw walker whereby the grain and unthrashed heads passing through the straw walker will be directed into the bottom of the trough.

22. In a harvesting machine, a winnower according to claim 5, wherein a hood is situated above the trough and the drum, and two series of baffles are pivotally secured to the hood and the sections of one series of baffles alternate with the sections of the second series of baffles.

23. In a harvesting machine, the combination with the subject matter of claim 7 of a peripherally disposed track or flanges on one end of the drum, a ring surrounding the drum and supporting rollers engaging the said track or flanges, trunnions projecting horizontally from the ring, bearings rotatively supporting the trunnions, means for adjustably supporting the opposite end of the drum whereby it can be maintained horizontally or at any desired inclination, and means for imparting rotation to said drum.

24. In a harvesting machine the combination with the subject matter of claim 4 of notches in the edges of the vanes disposed helically around the rotatively mounted drum.

In witness whereof I hereunto affix my signature.

THOMAS JELBART.